United States Patent [19]

Brannan et al.

[11] Patent Number: 5,374,491
[45] Date of Patent: Dec. 20, 1994

[54] HIGH DENSITY, HIGH CAPACITY BATTERY ELECTRODE

[75] Inventors: James R. Brannan, Perry; Anthony J. Vaccaro, Concord; John P. Healy, Willoughby Hills, all of Ohio

[73] Assignee: Eltech Systems Corporation, Chardon, Ohio

[21] Appl. No.: 100,227

[22] Filed: Aug. 6, 1993

Related U.S. Application Data

[63] Continuation-in-part of Ser. No. 1,246, Jan. 27, 1993, abandoned.

[51] Int. Cl.$^5$ .............................. H01M 4/02
[52] U.S. Cl. .................... 429/218; 429/235; 205/96; 205/150; 205/184
[58] Field of Search ............. 205/150, 96, 184; 421/218, 235

[56] References Cited

U.S. PATENT DOCUMENTS

| | | |
|---|---|---|
| 3,694,325 | 6/1971 | Kotz et al. |
| 4,251,603 | 2/1981 | Matzumoto et al. ............... 424/94 |
| 4,687,553 | 8/1987 | Solomon et al. .................. 204/16 |
| 4,978,431 | 12/1990 | Brannan et al. .................. 204/28 |
| 5,098,544 | 3/1992 | Brannan et al. .................. 204/206 |

FOREIGN PATENT DOCUMENTS

| | | |
|---|---|---|
| 26435 | 2/1977 | Japan. |
| 54235 | 11/1987 | Japan. |

*Primary Examiner*—Stephen Kalafut
*Assistant Examiner*—M. Nuzzolillo
*Attorney, Agent, or Firm*—John J. Freer

[57] ABSTRACT

There is now provided an improved manufacturing method for increasing the active material filling density in a small DTR reticulated nickel sheet. The nickel sheet has desirable physical properties such as resistance to breakage and crushing, in repeated bending. This resistance can be for both the surface area and the central area, in the thickness direction of the sheet. Such small DTR sheet has not previously been preferred as a battery electrode material because of a smaller filling density using conventional methods. There is now provided a battery electrode having high filling density of active material, high utilization rate of the impregnated active material and high capacity density with long life. Furthermore, a method of producing such small DTR of reticulated nickel sheet in a continuous and economical manner is disclosed.

6 Claims, 7 Drawing Sheets

HIGH DENSITY, HIGH CAPACITY BATTERY ELECTRODE

CROSS-REFERENCE TO RELATED APPLICATION

This application is a continuation-in-part of U.S. patent application Ser. No. 08/001,246 filed Jan. 27, 1993, now abandoned.

FIELD OF THE INVENTION

The present invention relates to a high-density, high-capacity battery electrode having broad utilization, to a method of producing a strip of reticulated metal which is used for production of the above battery electrode, and to a method of producing such battery electrode.

BACKGROUND OF THE INVENTION

Some proposals have already been made regarding the use of a reticulated metal sheet, having open cells, for the production of battery electrodes. For example, U.S. Pat. No. 3,694,325 proposes a method of production of fairly uniform nickel sheet (uniformity across the direction of the thickness) having a comparatively smaller ratio of plated nickel metal between cell strands at the surface area of the sheet and cell strands at the central part of the sheet, in the direction of thickness of the sheet. As discussed in the patent, there can usually be a ratio of the outermost fiber plating deposit thickness, to the innermost fiber plating deposit thickness. This ratio can be termed a deposit thickness ratio, also called a differential thickness ratio or, in either case, the DTR. The U.S. Pat. No. 3,694,325 proposes a batch process of sheet preparation and a uniform reticulated nickel sheet which might have a DTR as small as 1.05:1 (plated Ni thickness at the surface area: thickness at the central part). The patent suggests that such a material can be used as an electrode of a fuel cell.

In addition, Japanese Public Disclosure No. 26435/1977 and Japanese Patent Publication No. 54235/1987 (U.S. Pat. No. 4,251,603) propose some battery electrode structures by impregnating active material into the void area of such reticulated nickel sheet.

In the production process of making reticulated metal sheet by an electrical plating method, in general, such sheet is produced using sponge-like plastic foam having open cells, as starting material. The plastic foam is pretreated to have threshold electrical conductivity such as by some electroless plating or painting procedure, then the electrically conductive foam is electrically plated by installing such foam as a cathode. The anode(s) is placed either at one surface or both sides of the foam sheet. In order to obtain a reticulated metal sheet having a uniform plating thickness into the direction of thickness, it is common to set an anode at both sides of the plastic foam and to conduct the plating on both sides at one time or on each side, one side at a time. In such a process, electric currents at the cathode have a tendency to gather at the surface of the foam sheet. Therefore it can become difficult to flow such currents into the central part of the sheet. Though various methods have been developed to get good current flow, if the thickness of a foam becomes thicker, or if the diameter of pores of a foam become smaller, it becomes more difficult to obtain a reticulated metal sheet having a small DTR. Particularly, it is substantially very difficult, according to the conventional plating method, to produce reticulated metal sheet having a DTR of 1:1.

Accordingly, U.S. Pat. No. 3,694,325 states that reticulated metal foam having DTR's up to 2.0:1 can be considered to be substantially uniform. The patent also suggests an electrode of a fuel cell as a possible application of such reticulated nickel sheet having larger DTR. Electrodes of fuel cells generally comprise a catalyst or the like by depositing on the surface of the internal void part of the sheet. A fuel gas passes through the void part to carry out a reaction on the surface of the catalyst. Therefore a reticulated material having a large internal space because of a large DTR will be desirable.

Japanese Public Disclosure No. 26435/1977 proposes a sandwich like electrode structure having two kinds of reticulated nickel sheets each of different porosity. A nickel sheet with larger porosity is placed at the inside as a core material and both sides are covered with smaller porosity sheet, to reduce the dropout of the impregnated active material from the internal sheet.

Japanese Patent Publication No. 54235/1987 contains test data which shows that the rate of loss of the active materials impregnated into the metal foam sheet as paste, can be improved by using the metal foam sheet having comparatively smaller pore diameter at both surfaces as contrasted to the inside of the sheet. Such pore size difference is naturally formed when the metal foam sheet is produced by electrical plating method. The use of reticulated metal sheets having larger DTR as battery electrodes has been proposed. In the Japanese Patent Publication No. 54235/1987, there is data showing the increasing filling density with increasing DTR, (or pore diameter). In addition, there are two examples with reticulated nickel foam sheet produced with the DTR substantially close to 1:1 and with a high DTR. Then, it is reported that the loss of the impregnated active material decreases with the increase of DTR of the sheet. By conducting the repeating electrical charge—discharge test (cycle test), it is concluded that a battery life is extended by using sheets with large DTR.

A reticulated metal sheet having a large DTR is generally inferior to a small DTR in physical properties; particularly in elongation, compression and bending properties. In the battery electrode application, the metal sheet is generally wound into cylindrical form. Then a sheet having poor physical properties will cause problems in the process of battery production. Other problems occur when using foam sheet with poor physical properties, such as battery performance is not uniform, battery-to-battery, and also the produced batteries may not achieve the design performance.

One reason is nonuniformity in various parts of the sheet, but another reason is large DTR. The strand strength near the central part of the sheet is not as strong due to the small amount of plated metal; thus there will be more breakage of the strands in the center area than in the external surface areas when the sheet is fabricated into a battery. Current collecting ability and electric conductivity will differ between the inside and outside of the sheet and thus the electrode cannot perform at design specifications.

A method has been disclosed of producing a reticulated metal strip continuously in U.S. Pat. No. 4,978,431. In addition, there is now disclosed a reticulated metal foam strip with small DTRs, which can be achieved by continuously and economically improving the process of the patent.

Following this invention, further research was conducted to develop an electrode having not only a large filling density of active material but also a superior overall performance as a battery, using a reticulated metal sheet with a DTR of 1.1–3.5:1 produced by utilizing this invention. Consequently a high performance electrode and its manufacturing procedure were produced based on the new findings.

SUMMARY OF THE INVENTION

The present invention provides a high capacity and long life battery electrode and its manufacturing method, using a reticulated metal sheet with DTR of 1.1~3.5:1, which sheets have superior physical properties, such as resistance to breakage, crushing and repeated bending without cracks.

The sheets are not greatly different in strand thickness and in pore size between the surface and, in the thickness direction, the center, but have not been used commonly by the conventional technology.

By providing suitable particle size active material and by making paste with a viscosity able to impregnate into the sheet smoothly, a battery electrode can be made which has a high filling density of active material, high utilization rate of impregnated active material and high capacity density.

Also, a continuous and economical manufacturing method for producing this reticulated metal sheet in strip shape having a DTR of 1.1~3.5:1 is provided in this invention.

DESCRIPTION OF THE PREFERRED EMBODIMENTS

Figure 1:
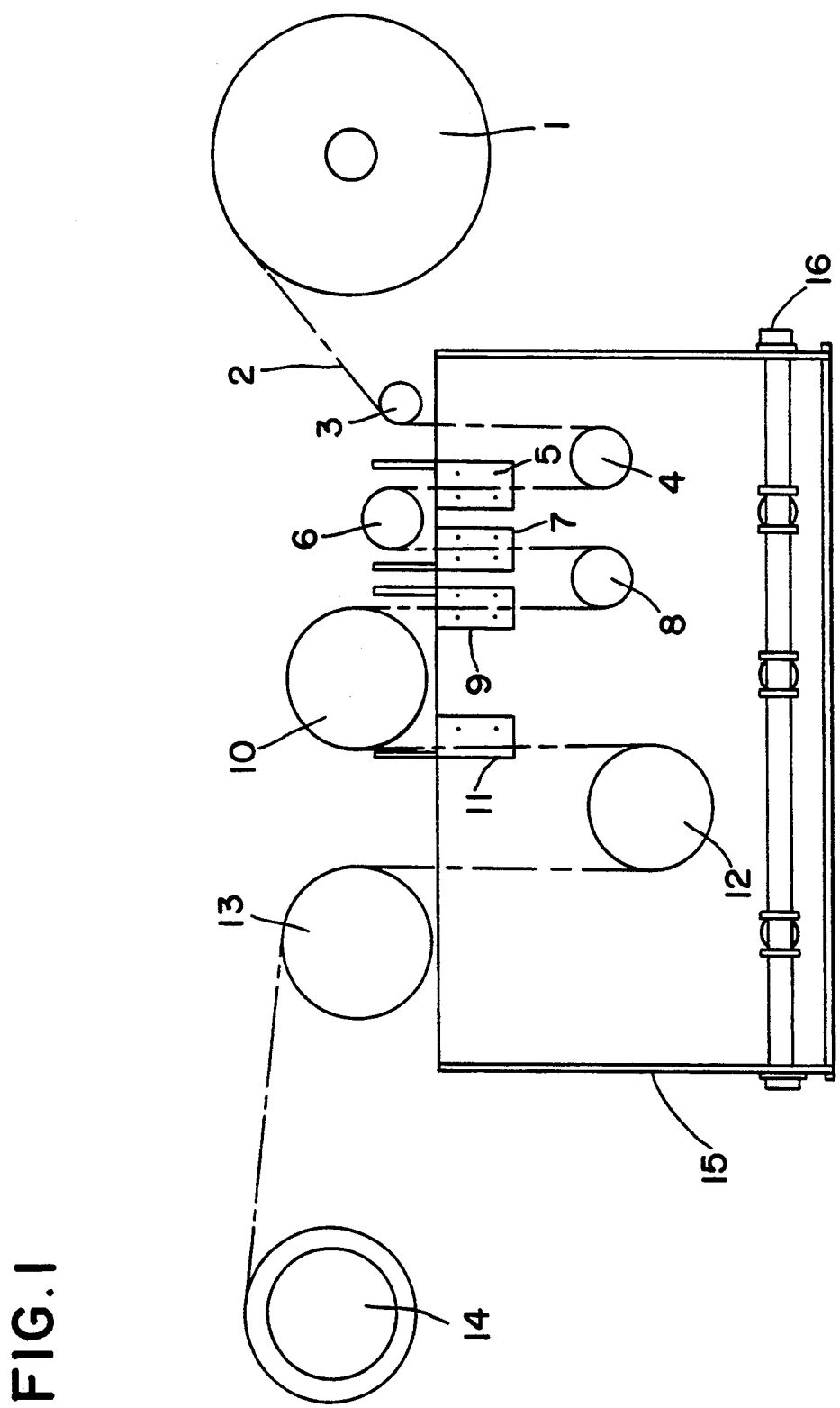
FIG. 1 shows electrical plating apparatus useful in the present invention.

The present invention is especially useful when the reticulated nickel sheet described herein is applied as a nickel electrode of a nickel-cadmium battery, and/or nickel and hydrogen electrode of a nickel-hydrogen battery. Conventionally, nickel sheets having a number of pores of 50–75 PPI (Pore Per Inch, i.e., number of pores per inch), thickness of 1.0–2.0 mm, nickel amount of 400–700 g/m$^2$, porosity of 90–95% and a relatively large DTR have been considered favorable for such electrodes.

An embodiment of the present invention is to use the reticulated metal sheets in a small range of DTR of 1.1–3.5 as battery electrode material, in which the range of DTR up to 2:1 are conventionally deemed to be essentially uniform. According to a novel method of production, reticulated metal sheet is produced economically with essentially uniform or small DTR, sheet which heretofore has been considered difficult to produce economically. Further, as a result of using such a small DTR foam sheen, an electrode having high current collecting ability can be obtained because of increased diameter and few defects of the interior strands in the sheet.

Attempts were made to produce reticulated nickel sheet according to the description of the Japanese Patent Publication No. 54235/1987. From these attempts, the following results were obtained.

TABLE 1

|  | Sheet A | Sheet B (Comp. Ex.) | Reference 1 | Reference 2 | Reference 3 |
| --- | --- | --- | --- | --- | --- |
| Production condition | High DTR sheet | Uniform Sheet |  |  |  |
| Current density | 3A/cm$^2$ | 1A/cm$^2$ | 0.75A/cm$^2$ | 0.50A/cm$^2$ | 0.014A/cm$^2$ |
| Period of current application | 5 min | 15 min | 20 min | 30 min | 1071 min |
| Total current applied | 15A min | 15A min | 15A min | 15A min | 15A min |
| Plating bath Watts bath | Watts bath | Watts bath | Watts bath | Watts bath | Watts bath |
| Stirring | No | Yes | Yes | Yes | Yes |
| Urethane foam used | 55 PPI | 55 PPI | 55 PPI | 55 PPI | 55 PPI |
| DTR in the obtained nickel foam | 10:1 | 6:1 | 4.8:1 | 3.6:1 | 1.2:1 |
| (Note) Surface condition | Dendrites formed | Nodules formed | Nodules formed | Smooth | Smooth |

Table 1 is the summary of the tests. In Table 1, both sheets A and B were produced by following the conditions described in the examples of No. 54235/1987. References 1~3 in the Table 1 were additional samples produced by changing the current density.

This reproducability test (producing sheets A and B) was conducted by following the described conditions as exactly as possible. For example, all productions were carried out batch wise, electroless plating was applied using palladium and with agitation of the plating bath. Thermal decomposition and annealing were also conducted after electrical plating.

However, for some conditions which were not described in the patent, estimated conditions were applied. Though the raw material foam thicknesses were slightly different (about 2.0 mm in the Japanese Patent and 1.5 mm in this test), as was the PPI, it is not considered that such differences had any significant influence on these results.

What was found out from this test result is that the Example B sheet plated at 1 A/cm$^2$, which is deemed in the patent to be substantially uniform to the center area, had a DTR of about 6:1. In the Japanese patent, it is said that an electrode using such a uniform and small DTR sheet exhibits rather poor performance compared to the larger DTR sheet plated at 3 A/cm$^2$. Accordingly, it is apparent that Japanese Patent Publication No. 54235/1987 aims for the area of much larger DTR. References 1 to 3 in the table show, as additional tests, the results of the production of sheets having smaller DTR. It is apparent that in the case of production of smaller DTR sheet, it is necessary to carry out the plating at a low current density, e.g., of 1/50th to 1/100th of the current density of Example B.

Figure 2:
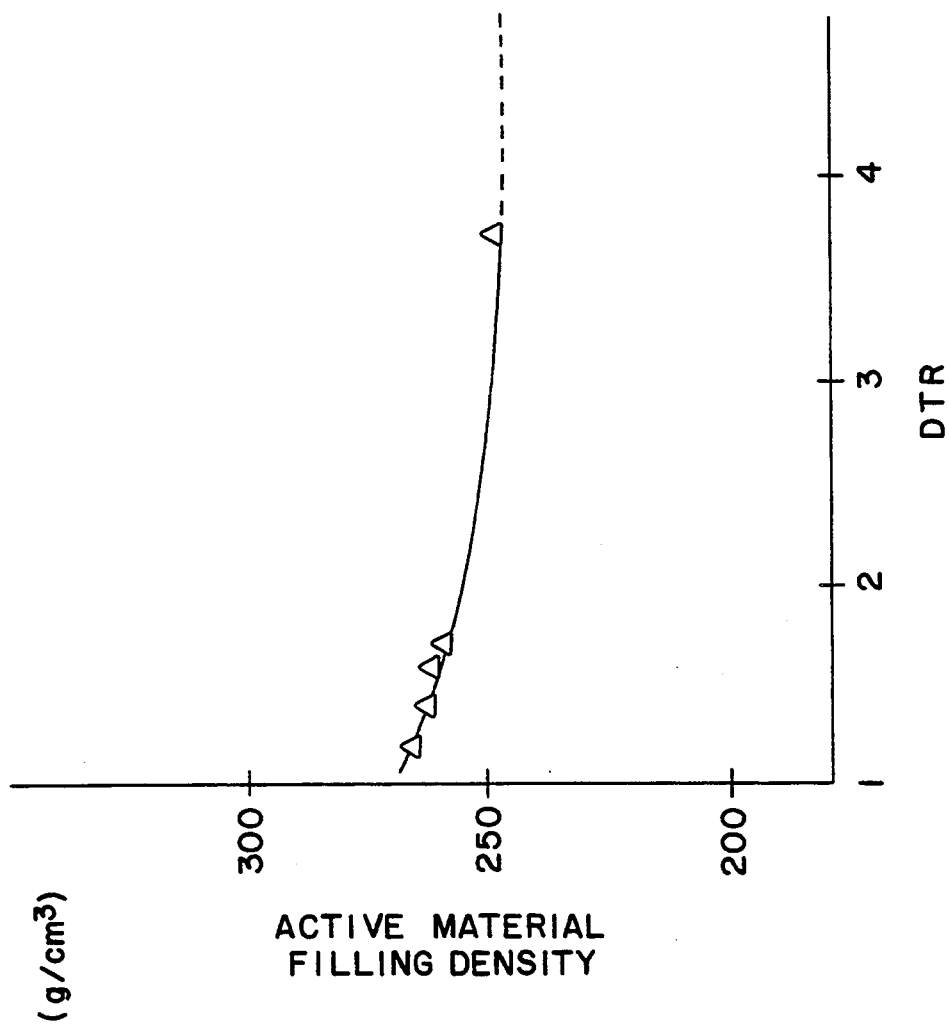
FIG. 2 shows the results of the test in Example 1: Active material filling density vs DTR of reticulated nickel sheet.
Figure 3:
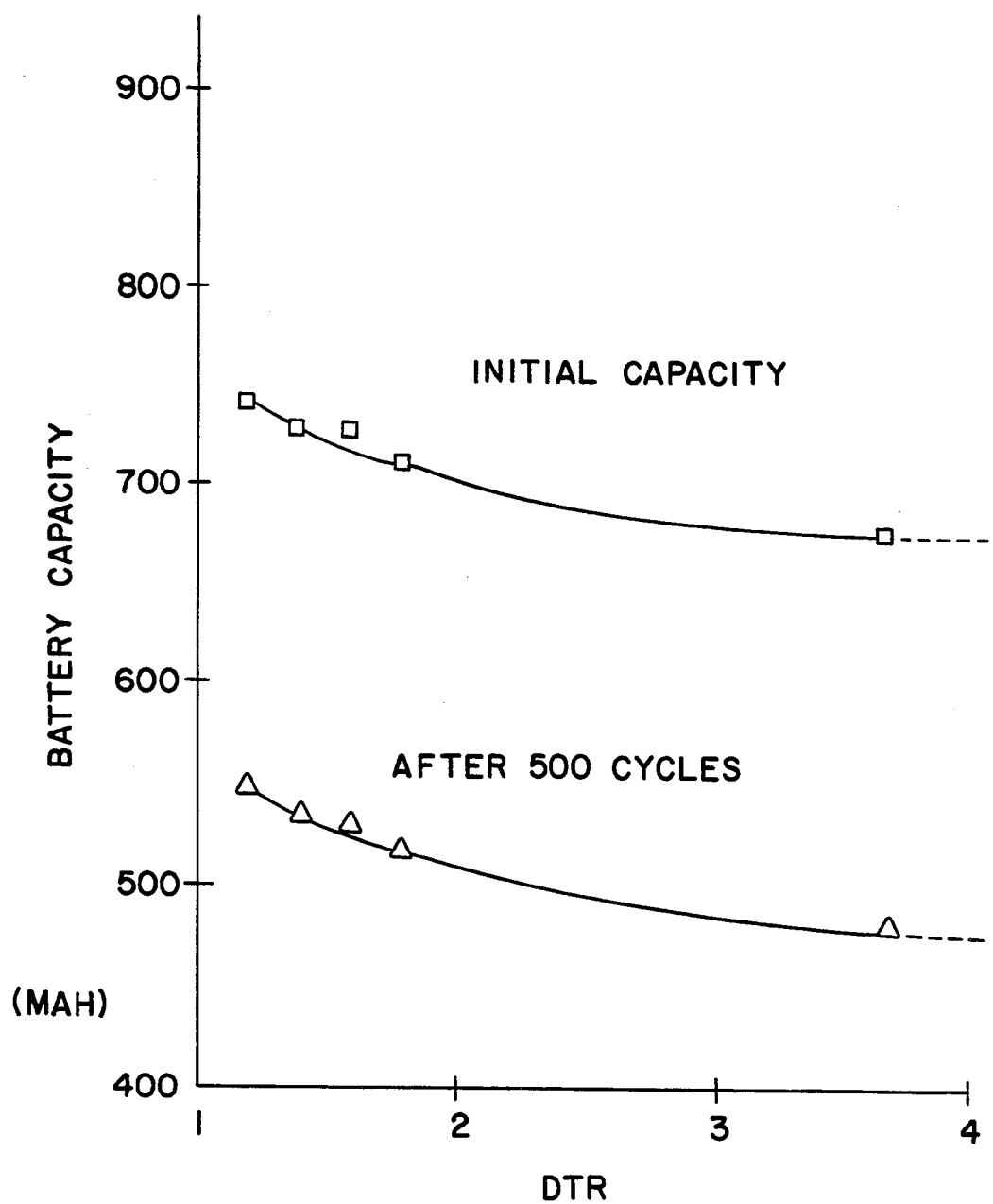
FIG. 3 shows the test results of Example 1: Battery capacity initially and after 500 cycle test vs DTR of nickel sheet.
Figure 4:
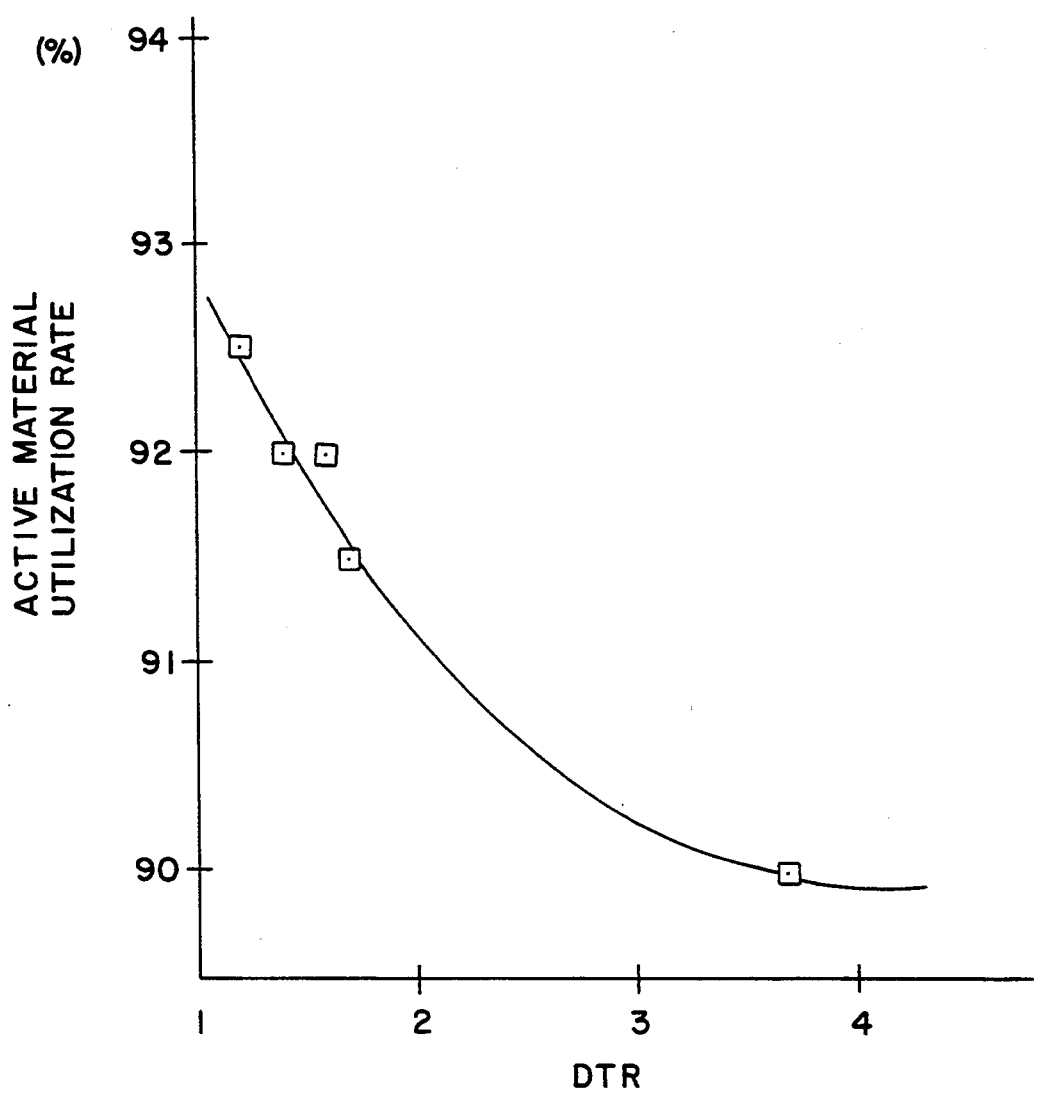
FIG. 4 shows the utilization rate of impregnated active material which is reported in Example 1.
Figure 5:
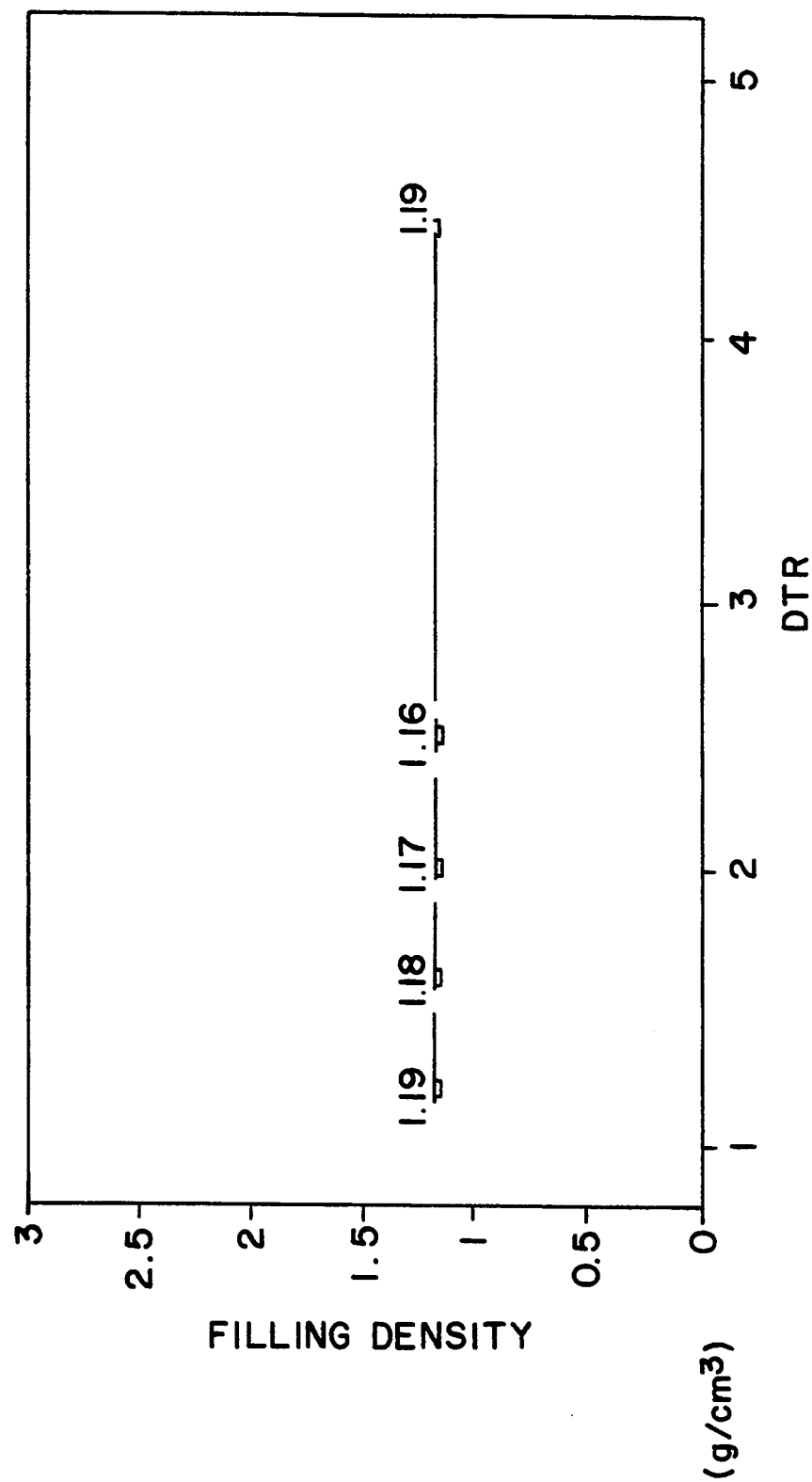
FIG. 5 shows the filling density of active material vs DTRs reported in Example 2.
Figure 6:
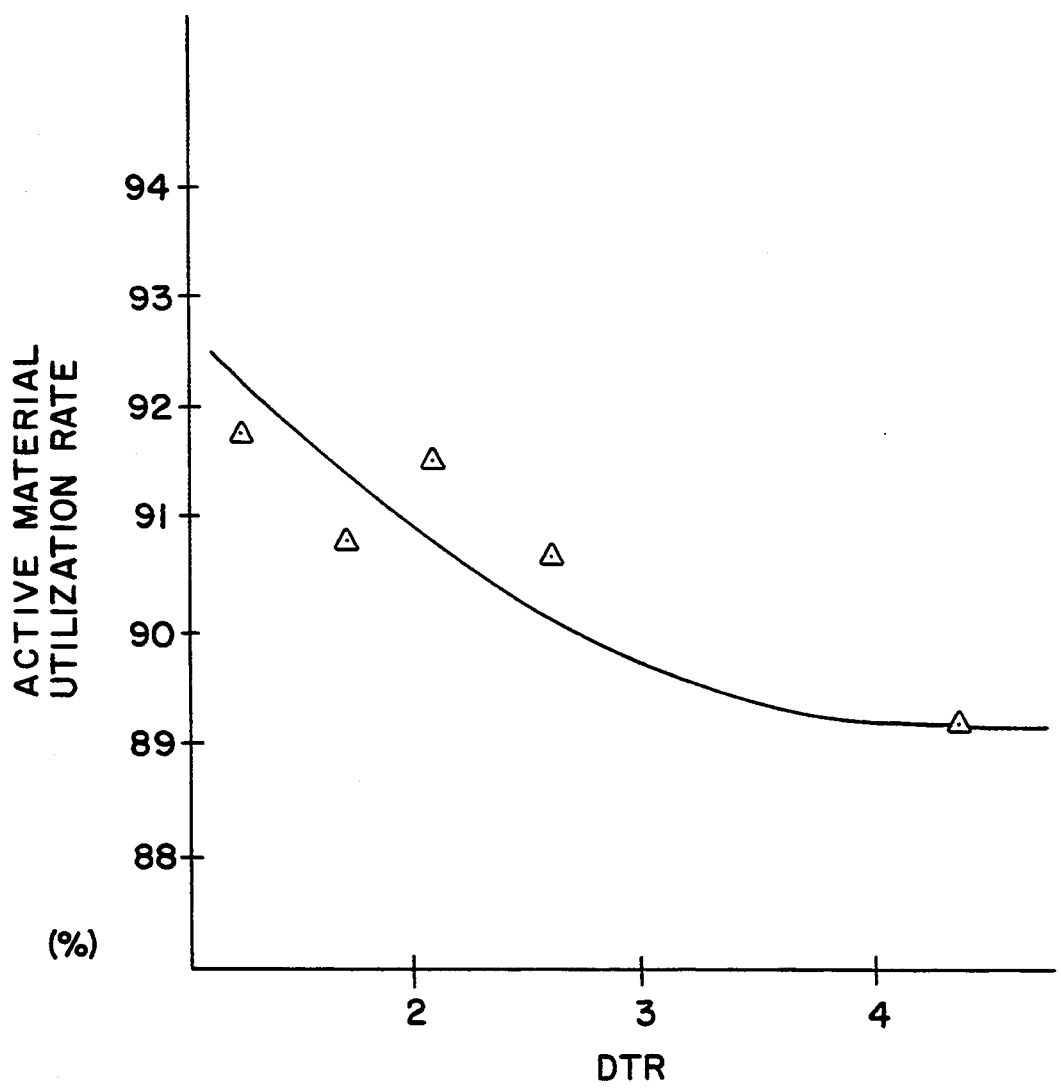
FIG. 6 shows the utilization rate of impregnated active material vs DTRs reported in Example 2.

Reticulated nickel sheets have now been produced having the same plating amount but with different DTRs using the same urethane foam, by employing a newly invented method of production. Then, pastes of active materials having a particle diameter sufficiently small compared with the pore diameter of the reticulated nickel sheets are used to fill the sheets to form electrodes. A series of tests were carried out to evaluate battery performance. These results are shown in FIGS. 2-6. FIGS. 2, 3 and 4 show the results obtained in Example 1 and FIGS. 5 and 6 show that results obtained in Example 2. The filling density of active materials in FIGS. 2 and 5 are, surprisingly, nearly the same over the whole region of DTRs tested. It seems that over the range there is very little effect that can be contributed to the DTRs. Through all these tests, there was not found the trend described in Japanese Patent Publication No. 54235/1987 that a filling density of active material increases with the increase of DTR. Since the two examples reported hereinbelow were conducted under different conditions, but have shown very similar tendency, the results are considered to be reinforcing. Accordingly, it appears to not be necessary to use the large region of DTR.

Further, with respect to the utilization rate of filled active materials, a similar result was also obtained in both Examples showing that the utilization rate increases with a decrease in DTR.

These two results have not been described in Japanese Patent Publication No. 54235/1987. The reason for such new results are explained below. Namely, one of the new characteristics—the improvement of filling density of active material—was achieved by using raw materials, such as nickel hydroxide and other metals, having smaller particle diameters, which have now been found suitable for the pore diameters of nickel sheet, and then impregnating the sheet by preparing a paste with adequate viscosity.

Particle diameter of nickel hydroxide on the order of 50-150 microns had been commercially available, but nickel hydroxide powders with much finer particles size have recently become commercially available.

In the present invention, tests have been carried out for sheets of various DTR's to determine the filling density of different nickel hydroxide powder having various particle sizes. As a result, it has been found that there is little effect on the filling density when going from a smaller DTR (about 1.2:1) up to a relatively large DTR (about 4.4:1). This result was achieved by selecting small particle size active materials having predetermined average diameters based on the average pore diameter of the surface of nickel sheet, and by preparing the paste of such active materials having predetermined viscosity to be able to impregnate smoothly into the sheet. Regarding filling and material loss (drop out) characteristics, for a sheet having an average size of pores, it would be quite reasonable on the one hand to think that paste of smaller size particles can be impregnated more easily than larger size particles. However, on the other hand, such fine particles will drop out more easily than the larger size. It is also quite natural to think that if there are two sheets having the same average pore size at the surface then, better filling and less dropout rate would be obtained for larger DTR sheets.

However, it has now become apparent that by using reticulated nickel sheets having different surface pore diameters of 200-450 microns and different thicknesses of 1.0-3.0 mm, and active materials having an average particle diameter of 2-30 (microns in the range of 1-15% as a particle diameter ratio to the pore diameter), by preparing such active material as a paste of adjusted viscosity within the range of 1-50 poises, preferable 5-20 poises, and impregnating into even different sheets, then, there is no significant difference observed on the filling density based on DTR. Even after the drying and other processing of the filled sheet to make a battery electrode, there is not much difference in the rate of loss of active materials for all the tested range of DTR. In the case where the average particle's diameter ratio to the average surface pore diameter is greater than 15%, impregnation to a sufficient level of density will become difficult since the particles cannot flow into the narrow places of the reticulated sheet. On the other hand, when this ratio is less than 1%, impregnation is easier but rate of loss of the impregnated materials tends to increase.

Materials for the paste viscosity adjustment include carboxymethylcellulose (CMC) and starch. For impregnation of the paste, pressurizing, spraying and vacuuming can be used. Consideration must be taken to select the most suitable filling method to meet production conditions such as continuous or batch processing as well as size, thickness and pore size of the sheet.

In other words a battery electrode production method has been invented by finding special paste conditions of the active material, which method allows the small DTR reticulated nickel sheet to be used as high capacity, high performance battery electrode material. Such small DTR sheets have not been used preferably for this application due to its low active material filling density, in spite of being recognized as having excellent physical properties.

Further, the second characteristic of the electrode produced according to this invention is high utilization of the filled active material. The phenomenon of increasing utilization rate in the region of smaller DTRs has been reported hereinbelow; in the examples. Such phenomenon can be explained as below.

In a reticulated nickel sheet having a small DTR, the amount of plated nickel on the internal strands has been increased compared to large DTR's. Then the physical strength and electrical conductivity of the internal strand area has been improved to approximate that of the surface. After the active material is filled and dried, the impregnated sheet will be processed further mechanically, including compression, cutting and coiling, etc. During such processes, any part having weak strength and low ductility will show the affects of defects in the strands, such as deleterious crushing and strand breakage. Such deformation and defects of the strands are apt to occur mainly at internal strands where the thickness of plated metal is not enough in the case of high DTRs. As a result, an average distance between an active material and a strand surface will be changed in the internal part of the sheet. Thus the electric conductivity of the internal part will be decreased, which causes a decrease in utilization rate of the impregnated active material, poorer ability of quick charging—discharging properties and shorter battery life, etc.

However, with an electrode using the sheet of the small DTR region according to the present invention, such deformation and breakage will be minimal at the center area, but in the event that it occurs, it will occur randomly all over the entire sheet. Accordingly, since the average distance between active material and nickel structure is uniform, good current conductivity is secured for the whole area; thus the reversible reaction of the active material can occur uniformly all over the electrode sheet. The utilization rate of the active material is improved and, at the same time, the battery performance, such as quick charging—discharging and cycled charging—discharging characteristics are also improved.

From the above, it can be understood that in the present invention, more benefits will be obtained for the smaller DTR sheet, assuming the PPI and plated amount of metal are the same.

In the electrode of the present invention, the filling density of the active material is little effected by the DTR value (but seems to slightly increase with a decrease in DTR). However, utilization rate of impregnated active material depends on the DTR. At high DTRs, the utilization rate is decreased. In the region of DTRs larger than about 3.5 to 4.5, no further significant decrease may be expected. Battery capacity can be expected not to be reduced in the range of DTR larger than about 2.5 to 3.0. Meanwhile, the preferable physical properties of the reticulated nickel sheet for use as a battery electrode will be obtained within the range of DTR smaller than 2.5. Judging from these factors, the preferable high side range of DTR will be about 2.5.

Regarding the preferable low side in the range of DTR, from the standpoint of physical properties required for the battery electrode, the smaller is preferred, as is the ease for the performance as a battery electrode made according to the present invention. However, the commercial production of a sheet of 1:1 DTR would be very difficult and would not be economical if the range of thickness, PPI or other factors for the battery are considered. Accordingly, the DTR of 1.2:1 is judged to be commercially favorable on the low side of the DTR range.

Thus, to summarize the above, the realistic and favorable DTR range for this invention will be about 1.2 to 2.5:1.

Incidentally, the DTR range of the electrode according to the present invention is not only applied to a reticulated metal sheet produced according to the method of production of this invention but shall be applied to any other similar sheets produced according to other plating methods. In addition, it is natural that the batteries applied to this invention are not only of the positive electrode of nickel-cadmium, nickel-hydrogen, nickel-iron and similar others, but also for the negative electrode of nickel-hydrogen and similar others.

Now, an economical and continuous method of production of reticulated metal sheet having a low DTR, another essential element of the present invention, is described.

A method of producing a reticulated metal sheet using open-cell plastic sheet as a starting material, coating by electroless plating or other method to give some electrical conductivity, electroplating thereon a desired metal and then decomposing and removing the core plastic from the inside at high temperature, has long been a known technology. However, there have been several technical problems for the mass-production of such a reticulated metal sheet. Particularly, it is difficult to electrochemically produce a small DTR sheet or, in other words, plate at a uniform thickness to the central part in the thickness direction of the sheet. A continuous production process for such reticulated metal foam sheet using a open-cell foam plastic sheet as a starting material has been taught in U.S. Pat. No. 4,978,431.

On the other hand, U.S. Pat. No. 3,694,325 proposes a method of producing such a reticulated metal sheet which makes a DTR as small as possible and discloses an example of producing a sheet with a DTR in the order of 1.05:1. However, this is a batch method, not the continuous method of U.S. Pat. No. 4,978,431.

There is now offered an improvement on the previous continuous technique, developing a new technique, producing a reticulated metal strip having a small DTR continuously and economically as described below.

The production means utilized for the present invention is shown in FIG. 1. There is used a supply roll 1 of a raw material plastic foam in strip form. A plastic foam sheet 2, which has already been treated to be semi-electrically conductive, passes through a pair of pre-plating anodes 5 at the front stage of a first zone having a guide roll 3 and an idler roll 4, then over a cathode conductor roll 6; and further passes through a pair of pre-plating anodes 7 at the back stage of the first zone; thus a pre-plating is carried out. The anodes can be fabricated in a rectangular shape of a metal basket (for example, made of titanium mesh) in which small pieces of metal (for example, nickel metal) are placed, and the anode connected to the anode terminal of a rectifier (not shown). The cathode conductor roll 6 is also connected to a cathode terminal of the rectifier.

The plastic sheet given a high electrical conductivity at the first zone enters the main plating area in the second zone over an idler roll 8. Here, the strip is plated first by a pair of anodes 9 at the front stage of the second zone, then passes over a cathode conductor roll 10 and is further plated by a pair of anodes 11 at the back stage of the second zone to obtain a desired plating amount. The anode basket and the cathode conductor roll of the second zone can also be connected to the terminals of a rectifier. The foam sheet plated with a desired amount of metal passes over an idler roll 12 and a guide roll 13 and is coiled by a take-up roll 14.

It is important in the present invention to reduce the number of rolls. This is because an electroplated metal is rather fragile and cracks easily if the running direction is repeatedly changed by passing over rolls having rather small diameters.

Therefore, a main plating zone having only one pair of anodes is preferred. However, in this case, the length of an anode may become extremely long, which is unfavorable in terms of equipment cost and maintenance.

However, when the plating operation is performed in only one zone, the current amount applicable to the semi-conductive plastic foam is restricted because of its low conductivity and hence the production speed shall be reduced substantially. In order to overcome this problem, a method of pre-plating has been employed before the main plating, to obtain sufficient electrical conductivity to carry out the main plating at an economical speed and to supply the necessary current density.

The pre-plating requires only a minimum amount of metal, sufficient to flow a current through the main plating cathode conductor roll without generating much heat. In the case of a usual means according to the present invention, plating weights of about 20 g/m$^2$–200 g/m$^2$ are sufficient and a current density in the range of 200–1,200 mA/cm$^2$ is employed.

This pre-plating need not always be carried out at a low current density taking a long time, but can be done at a relatively high current density in a short period of time, since it was found that the pre-plated metal condition does not have any significant influence upon the uniformity of the main plating thickness.

The current density for the pre-plating in the first zone is usually larger than the current density for the main plating in the second zone, and can be in the favorable range of 1.5 to 100 of the second zone. By employing such comparatively high current density at the first zone, the surface of the first zone anodes can be very small compared to the second zone, so that the total system can also be much smaller, thus saving on the fabrication cost of the system. The pre-plated plastic sheet is transferred to the main plating process of the second zone.

The main plating is carried out using anodes having a large surface to deposit the desired amount of metal at a relatively low current density, and for which, it takes a longer period of time. The DTR value is regulated by the current density. A smaller DTR can be obtained by applying a lower current density. However, the desired current density can be determined according to the other conditions such as number of pores (PPI), specific gravity and thickness of the foam. In this second zone, the current density to be employed will be in the range of 5 mA/cm$^2$–800 mA/cm$^2$. The main plating at the second zone shall preferably be carried out by as few stages as possible. If the number of stages of plating becomes large, cracking of the plated metal will occur due to the repeated bending.

As shown in FIG. 1, a pair of anodes 5, 7 set at both sides of a conductor roll 6 is referred to as one, or a pre-plating stage. One anode stage is sufficient for the first zone, and also one anode stage is preferable for the second zone. However, in a case where the anode area of the second zone is rather small and the operation cannot be performed at an economical speed; then, the second zone can be of two anode stages. Alternatively, the whole second zone may be installed separately in another plating tank to carry out the main plating.

Though in the description of an exemplary process, only nickel plating using a sulfamate acid bath is mentioned, it should be understood that the plating of other metals, such as copper, iron, etc. shall also be included in this invention as well as other types of electroplating baths.

It is an important factor to circulate the bath well during the main plating at the second zone so that it will permeate into the central part of the thickness of the plastic foam in order to produce a small DTR sheet. In the case of said plating equipment, the foam strip moves in the electrolyte which stirs the bath as it moves. In the case of preparing a small DTR sheet according to the present invention, this stirring is not sufficient and it is necessary to add at least one additional stirring method, for example; bubbling by injection of gas, forced circulation of the electrolyte or application of a liquid jet.

The thus obtained deposited metal has a plastic core inside of it. Since the deposited metal is generally fragile, it is not suitable for use, as is, as an electrode.

Generally, after the completion of plating, the metallized foam is washed, dried, thermally decomposed, and then annealed in a reducing atmosphere to obtain a reticulated metal sheet with desired physical strength.

Regarding this thermal-decomposition method, the specification of U.S. Pat. No. 4,687,553 suggests a multistage heat-decomposition method in order to avoid the breakage of plated metal and to remove metal oxides formed on the strip surface by the thermal decomposition. According to the patent, when nickel is plated, thermal decomposition is conducted at a temperature in the range of about 500°–800° C. for up to about 3 hours depending on the plastic foam (polymer) used. Annealing can be carried out by an ordinary method. For example, in the case of nickel, it is carried out in a hydrogen atmosphere at a temperature in the range of about 800°–1200° C. for up to about 30 minutes. The thus obtained reticulated metal foam sheet has an average porosity of about 93–95% with a small DTR. This means that nickel is uniformly plated onto the inside strands and can be used as the abovementioned high-density, high-capacity battery electrode.

Hereunder, the embodiments of the present invention are described in more detail according to the following two Examples.

EXAMPLE 1

Reticulated nickel sheets using a generally used, commercially available urethane foam were produced; then, batteries were produced to examine their performance.

(1) Production of reticulated nickel sheet

A soft, open-cell foamed urethane strip having 55 PPI and a thickness of 1.5 mm was contacted with a colloidal dispersion of carbon black. The carbon coated strip was dried at 149° C. (300° F.) to prepare a semi-electrical conductive strip. The obtained conductive sheet was electroplated preparatorily in the first zone of a continuous plating apparatus as shown in FIG. 1. The electroplating bath had a composition of nickel sulfamate containing 120 g/l of nickel, 30 g/l of boric acid and 6 g/l of nickel chloride.

The bath was maintained at 57° C. with a pH of 3.5 and 7.5 mg/cm$^2$ of nickel was preplated continuously at a current density of 500 mA/cm$^2$.

This operation remarkably increased the electric conductivity of the foam, which made the next plating step very easy.

The pre-plated sheet was plated in a separate second plating zone in a batch plating tank at current densities shown in the Table 2, with a goal of depositing 500 g/m$^2$ of nickel. The plating times listed are within about ±5 to 10 percent. Batch plating was used to give desirable control over the current density and to achieve uniform plating on the preplated foam. The procedure used, preplating continuously followed by batch plating, mimics the continuous process described in FIG. 1.

Each plated nickel strip was washed and dried, subjected to thermal decomposition in air at 500° C. for about 1 hour, and then annealed in an atmosphere of hydrogen at 1100° C. for about 10 minutes to obtain a desired nickel sheet strip.

Each sheet had the DTR and diameter of pores, as shown in Table 2 below.

TABLE 2

| (1) Electroplating conditions | | | | | |
|---|---|---|---|---|---|
| (1) 1st zone plating current density (mA/cm$^2$) | 500 | 500 | 500 | 500 | 500 |
| (2) 2nd zone plating current density (mA/cm$^2$) | 588 | 325 | 260 | 110 | 13 |
| Plating time (sec) | 213 | 436 | 561 | 1311 | 10927 |
| Current amount (A · min) | 2.07 | 2.36 | 2.43 | 2.40 | 2.37 |
| (2) Nickel Sheet | | | | | |
| (1) Weight (g/m$^2$) | 490 | 495 | 495 | 470 | 495 |
| (2) PPI | 55 | 55 | 55 | 55 | 55 |
| (3) DTR | 3.7:1 | 1.7:1 | 1.6:1 | 1.4:1 | 1.2:1 |
| (4) Average surface pore diameter microns | 420 | 430 | 440 | 410 | 430 |

As is seen in this example, it is very difficult to obtain a completely uniform sheet having a DTR of 1:1. The measurement of DTRs was carried out according to the following method. A section of a sample sheet to be measured was encapsulated with an epoxy resin and then cut to expose its surface. The sample was observed first at 40×magnification. Three strands of each surface side and of the central part were selected respectively. Each had nearly regular triangular shape and each had similar surface area at the cut profile. These were then observed at a higher magnification.

The nickel strand thickness at each open triangular profile was measured to obtain an average strand thickness. The ratio of the strand thickness of the surface area against the central part was calculated as average total strand thickness ratio (DTR). About 10 sections from different portions of each sample were measured to obtain DTRs described in Table 2.

Figure 7:
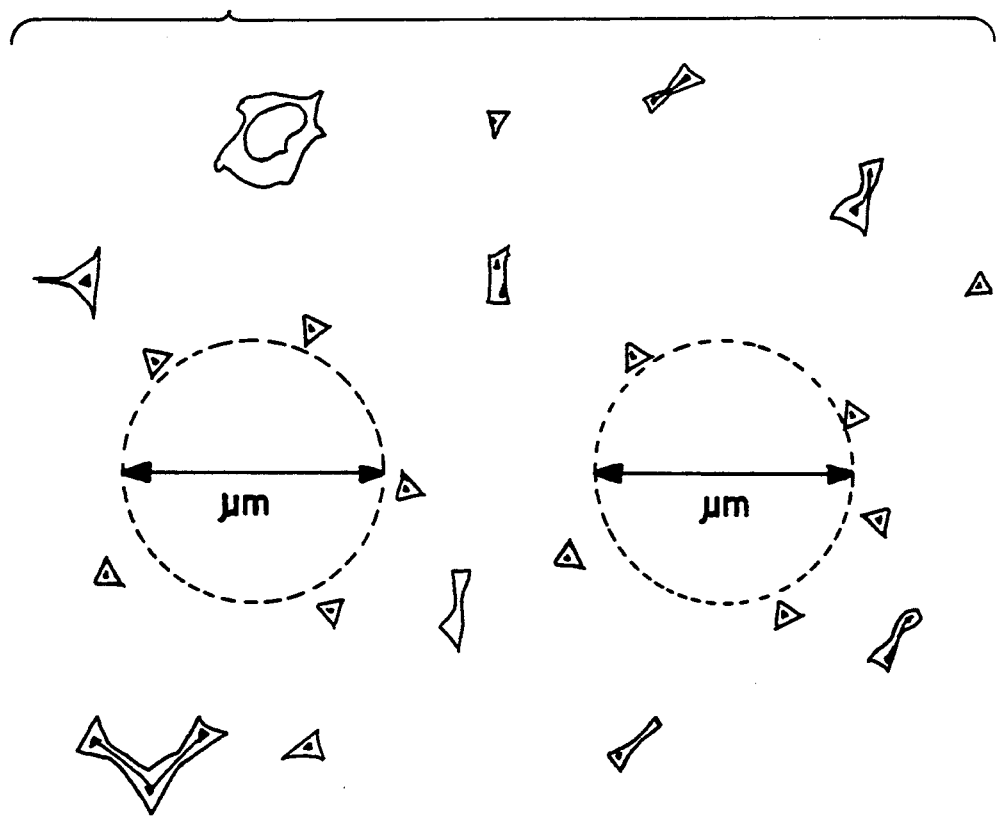
FIG. 7 is a magnified sectional view of a reticulated nickel sheet, showing pore size.

The measurement of pore sizes was also carried out as follows, reference being made to FIG. 7. In the same manner as in the measurement of DTRs, a section of a sample was encapsulated with an epoxy resin and, after sectioning, observed with a microscope to select the strand profiles having nearly regular triangular shape but smaller. Then selection was made from the triangular shapes, observing positions susceptible to drawing a circle as shown in FIG. 7. A circle was drawn and its diameter, designated μm (microns) in FIG. 7, was found. Such measurement was conducted for the different portions repeatedly to obtain each pore size (diameter).

(2) Performance of the Electrodes

The above reticulated nickel sheets were filled with paste-like active material containing nickel hydroxide and fabricated into a nickel-cadmium battery. Then their performance as a positive electrode were tested.

(i) Active material paste

A CMC solution was mixed with 100 parts of active material, which contains 85% by weight of nickel hydroxide powder with an average particle diameter of 20 μm (microns), 10% by weight of metallic nickel powder with an average diameter of about 10 microns and 5% by weight of a metallic cobalt powder. Moisture was adjusted to prepare the paste viscosity to 35 poises and the active material concentration at about 1.6 g/cm$^3$.

(ii) Preparation of nickel electrodes

First, each nickel sheet was compressed to a desired thickness of 1.0 mm by rolling to obtain this thickness and then dipped in the above active material paste to impregnate the paste into the nickel sheet at reduced pressure of 0.1 atmospheric pressure. After drying, the filled plates were compressed by a pressure of 5 tons/cm$^2$ cut into sheets with a width of 41 mm and a volume of 1.3 cm$^2$. Then a current connector was welded onto each sheet to make a nickel electrode.

(iii) Preparation of battery

The nickel electrode was wound together with a conventional cadmium electrode and a separator. It was then put into a can, and potassium hydroxide with a specific gravity of about 1.3 was poured therein and sealed. This is a positive electrode capacity control type of nickel cadmium battery having an expected capacity of about 700 mAH.

(iv) Battery test

The following test were performed using the above-described AA-type battery.

1) Capacity test: Charged at 20° C. 0.1 C for 15 hours, then discharged to 1 V at 0.2 C.
2) Cycle test: After being charged at 20° C., at 1 C (standard charge rate) until the voltage dropped by 25 mV from its maximum, discharged to 1 V at 1 C, which cycle was repeated 500 times and the discharge amount at 500th cycle was recorded.

The results of the above test are shown in Table 3.

TABLE 3

| Sample No. | DTR | Nickel sheet before filling & after thickness adjustment | | Nickel electrode after paste filling and pressing | | Capacity test at 0.2 C discharge | 500 cycle test |
|---|---|---|---|---|---|---|---|
| | | Thickness (mm) | Porosity (%) | Thickness (mm) | Active material filling density | Battery capacity (mAH) | 1C discharge (mAH) |
| 1 | 3.7 | 0.960 | 94.2 | 0.557 | 2.51 | 683 | 481 |
| 2 | 1.7 | 0.958 | 94.3 | 0.539 | 2.60 | 680 | 519 |
| 3 | 1.6 | 0.954 | 94.3 | 0.536 | 2.63 | 713 | 533 |
| 4 | 1.4 | 0.945 | 94.6 | 0.528 | 2.63 | 728 | 534 |
| 5 | 1.2 | 0.945 | 94.2 | 0.530 | 2.66 | 740 | 548 |

As is apparent from above, the higher filling density was obtained at the smaller DTR area, although there is no significant difference in these nickel sheet porosities. This is a surprising result, judging from the data described in Japanese Patent Publication No. 54235/1987. Initial battery capacity has also been increased at the smaller DTR area. This is due to a high utilization rate at smaller DTR area. Also, higher battery capacities by cycle test were obtained at the smaller DTR area. One of the major reasons would be due to the more uniform mean distances between the strand surface and active material all over the electrode, and of lesser breakage of internal strands, because of thicker strands of smaller DTR sheet. And, further, such data suggest the loss of impregnated material at the small DTR area is not significant to affect their performance.

The above results are shown in FIGS. 2 and 3.

The utilization rate of the impregnated active material is also shown in FIG. 4.

EXAMPLE 2

Next, urethane foam sheet having the largest number of pores per inch presently commercially available, was used and the produced reticulated nickel sheets were tested.

(1) Production of reticulated nickel sheets.

An open-cell urethane foam sheet having 75 PPI with thickness of 1.7 mm was coated with carbon black in the same manner of Example 1, and the urethane sheet was pre-plated continuously at a current density of 500 mA/cm$^2$ at the first zone of a continuous plating apparatus to deposit about 7.5 mg/cm$^2$ of nickel thereupon.

Subsequently, the urethane foam strip having a high electric conductivity was subjected to plating as in Example 1 but at the current densities shown in Table 4 respectively, aiming at 600–650 g/m$^2$ of nickel weight, and then each strip was treated in the same manner as in example 1 to obtained a reticulated nickel sheet.

The production conditions and data of the products are shown in Table 4.

TABLE 4

|  | Sample 1 | Sample 2 | Sample 3 | Sample 4 | Sample 5 |
|---|---|---|---|---|---|
| (1) Electroplating conditions | | | | | |
| (1) 1st zone plating Current density (ma/cm$^2$) | 500 | 500 | 500 | 500 | 500 |
| (2) 2nd zone plating Current density (ma/cm$^2$) | 600 | 340 | 260 | 110 | 13 |
| Plating time (sec) | 326 | 595 | 697 | 1647 | 15360 |
| Current amount (A · min) | 3.26 | 3.37 | 3.02 | 3.02 | 2.82 |
| (2) Nickel Sheet | | | | | |
| (1) Weight (g/m$^2$) | 627 | 600 | 620 | 650 | 650 |
| (2) PPI | 75 | 75 | 75 | 75 | 75 |
| (3) DTR | 4.4:1 | 2.5:1 | 2.0:1 | 1.6:1 | 1.2:1 |
| Average surface pore diameter/μm | 320 | 330 | 335 | 320 | 340 |

(2) Performance of the electrode.

The above reticulated nickel sheet was filled with active material paste, then tested as a battery electrode. Differences from Example 1 are that these sheets were not formed into a cylindrical type of battery. Their initial performance was measured as a flat-plate electrode.

(i) Active material paste

Since the average pore diameter of the nickel sheet is smaller than that of Example 1, active materials with smaller particle sizes were selected and a lower viscosity paste was prepared.

A CMC solution was added into the mixture of active material powder containing 90% by weight of a nickel hydroxide powder with an average particle diameter of about 15 microns and 10% by weight of metallic cobalt, to prepare a paste with a viscosity of about 10 poises.

(ii) Preparation of nickel electrodes

Each nickel sheet was cut to 30 mm × 50 mm plaques and then completely manually impregnated with the above active material paste, then dried. The resultant sheets were pressed to prepare an electrode plate with a desired active material density of 2.5 g/cm$^3$.

(iii) Performance test

Each nickel electrode was installed with an ordinary cadmium electrode to form a battery in an electrolyte of aqueous potassium hydroxide solution with a specific gravity of about 1.3. Initial performance as a battery was measured.

Battery capacity was measured by charging at 0.2 C for 9 hours and then discharging at 0.5 C until the cell voltage decreased by 0.8 V. Then the theoretical capacity (impregnated amount × 289 mAH/g) was calculated to find the utilization rate of the impregnated active material.

The results are shown in FIGS. 5 and 6.

FIG. 5 shows the filling densities vs. DTRs. The data has little relation on the change of DTRs which is the similar result with Example 1. But it seems that in the smaller DTR area, the rate of filling density tends to slightly increase.

In FIG. 6, the utilization rate of the impregnated active material vs. DTR is shown. Utilization rate increases in the area of smaller DTRs.

It is apparent from the above two Examples that the electrode produced according to the present invention exhibits excellent performance in the area of smaller DTRs.

These data are different and diametrically opposed to the data of Japanese Patent Publication No. 54235/1987. An electrode produced by the present invention using a reticulated nickel sheet having small DTR results in excellent performance characteristics as contrasted to the results shown in the Japanese patent publication.

EFFECT OF THE INVENTION

As shown in the two examples: 1) there is provided an improved manufacturing method for increasing the active material filling density in the small DTR reticulated nickel sheet, which nickel sheet has essentially good, similar physical properties such as resistance to breakage, even with repeated bending, with resistance shown both on the surface area and at the central area in the thickness direction of the sheet, but such sheet has not been previously preferred as battery electrode material because of smaller filling density using conventional methods; 2) Then provide a battery electrode having high filling density of active material, high utilization rate of the impregnated active material and eventually high capacity density with long life; and 3) furthermore, a method of producing such small DTR reticulated nickel sheet in a continuous and economic manner.

We claim:

1. A method of producing a battery electrode reticulated metal sheet continuously and efficiently, having a deposit thickness ratio (DTR) in the range of 1.1–3.5:1 with the method including electroplating, which method comprises:

(1) providing a plastic foam sheet comprising an open-cell plastic foam and giving electrical conductivity onto said foam prior to electroplating;

(2) establishing a plater which is comprised of two zones, the first for replating and the second for main plating, each including a plating bath which is comprised of nickel sulfamate, with each zone having one or more pairs of anodes and with each zone having at least one stirring means of the bath other than that resulting from movement of the foam sheet through the bath, and (3) carrying out plating by passing the prepared sheet from step (1) through the plater as follows:

(i) electrodepositing nickel of 20–200 g/m$^2$ at the pre-plating first zone, on the prepared foam sheet to provide a foam sheet of electrical conductivity, by maintaining a current density in the pre-plating first zone of less than 1200 mA/cm$^2$;

(ii) electrodepositing nickel in the main plating zone at a current density of 5-800 mA/cm$^2$;

(iii) washing and drying the resulting plated sheet outside of the plating tank;

(iv) carrying out thermal decomposition of the resulting sheet to decompose and remove the core plastic; and (v) annealing in a reducing atmosphere the metal sheet.

2. The method according to claim 1, in which the anode group in the first zone and the anode group in the second zone comprise different plating tanks, respectively.

3. The method according to claim 1, in which the number of anode group stages for the main plating in the second zone is one.

4. The method according to claim 1, in which the number of anode group stages for the main plating in the second zone is two.

5. The method according to claim 1, in which the plating bath is a Watts bath.

6. A battery electrode having a reticulated metal sheet produced by the method of claim 1, which sheet is an open-cell, three dimensional reticulated metal sheet having continuously connected strands, having a deposit thickness ratio (DTR) in the range of 1.1–3.5:1, a sheet thickness of 0.5–3.0 mm, the number of pores of said sheet being 16–36/cm (40–90/inch), with the average diameter of the pores on the surface of the sheet being 200–450 microns, and having a plating weight of 200–1,000 g/m$^2$, with the sheet having a filling of active material.

* * * * *